United States Patent
Flammia et al.

(10) Patent No.: US 10,457,296 B2
(45) Date of Patent: Oct. 29, 2019

(54) VEHICLE PROPULSION SYSTEM AND METHOD

(71) Applicant: General Electric Company, Schenectady, NY (US)

(72) Inventors: Marc Flammia, Contagem (BR); Geraldo Alwin Griese, Contagem (BR); Leonardo Cezar de Faria Pessoa, Contagem (BR); Felipe de Oliveira Bottosso, Contagem (BR)

(73) Assignee: GE GLOBAL SOURCING LLC, Norwalk, CT (US)

(*) Notice: Subject to any disclaimer, the term of this patent is extended or adjusted under 35 U.S.C. 154(b) by 562 days.

(21) Appl. No.: 15/172,730

(22) Filed: Jun. 3, 2016

(65) Prior Publication Data

US 2017/0349187 A1 Dec. 7, 2017

(51) Int. Cl.
| | | |
|---|---|---|
| *B61C 3/00* | (2006.01) | |
| *B60L 15/00* | (2006.01) | |
| *B60L 9/18* | (2006.01) | |
| *B60L 50/14* | (2019.01) | |
| *B60L 50/51* | (2019.01) | |

(52) U.S. Cl.
CPC ............. *B61C 3/00* (2013.01); *B60L 9/18* (2013.01); *B60L 15/007* (2013.01); *B60L 50/14* (2019.02); *B60L 50/51* (2019.02); *B60L 2200/26* (2013.01); *B60L 2210/44* (2013.01); *B60Y 2200/31* (2013.01); *B60Y 2200/91* (2013.01); *B60Y 2200/912* (2013.01); *B60Y 2200/92* (2013.01); *B60Y 2400/604* (2013.01); *B60Y 2400/61* (2013.01); *Y02T 10/645* (2013.01); *Y02T 10/646* (2013.01); *Y02T 10/70* (2013.01); *Y02T 10/7005* (2013.01); *Y02T 10/7077* (2013.01); *Y02T 10/7241* (2013.01); *Y10S 903/915* (2013.01)

(58) Field of Classification Search
CPC ........ B61F 3/04; B60L 11/02; B60L 2200/26; B60L 15/32; B60L 15/007; B60L 9/18; B60L 11/1803; B60L 11/10; B60L 50/61; B61C 3/00
See application file for complete search history.

(56) References Cited

U.S. PATENT DOCUMENTS

| | | | | |
|---|---|---|---|---|
| 4,765,552 A * | 8/1988 | Sugioka | ................. | B65H 54/40 242/412 |
| 6,456,908 B1 * | 9/2002 | Kumar | ................. | B60L 3/0023 318/490 |
| 8,371,230 B2 * | 2/2013 | Kumar | ...................... | B60L 7/06 105/35 |
| 8,924,051 B2 * | 12/2014 | Araki | ....................... | B60L 7/14 701/19 |

FOREIGN PATENT DOCUMENTS

JP 07227008 A * 8/1995 ............. B60L 15/32

* cited by examiner

*Primary Examiner* — S. Joseph Morano
*Assistant Examiner* — Scott A Browne
(74) *Attorney, Agent, or Firm* — Josef L. Hoffmann; The Small Patent Law Group LLC

(57) ABSTRACT

A propulsion system includes plural inverters configured to be onboard a vehicle and to convert direct current into an alternating current, and plural motors configured to receive the alternating current from the inverters. The motors also are configured to be operably coupled with axles of the vehicle to rotate the axles. The inverters are configured to be coupled with and control the motors that rotate non-neighboring axles of the axles in the vehicle.

11 Claims, 3 Drawing Sheets

VEHICLE PROPULSION SYSTEM AND METHOD

FIELD

Embodiments of the subject matter disclosed herein relate to propulsion systems for vehicles.

BACKGROUND

Some propulsion-generating vehicles include multiple axles that are rotated by one or more motors to rotate wheels connected with the axles and propel the vehicles along a route. For example, some rail vehicles include motors that work to rotate axles of the rail vehicles to move the rail vehicles along a track. Each motor may separately rotate a different axle of the rail vehicle. In a locomotive, this can involve eight motors separately rotating eight different axles to separately rotate eight different sets of wheels. Each axle and motor being controlled by its own motor speed control device (motor speed controller and inverter). The individual rotation of each axle by a different motor controller (inverter) allows for greater control over movement of the rail vehicle, increasing overall ability to maximize traction, but also significantly adds to the expense and complexity of the vehicle.

Conversely, some vehicles include motor speed controllers that each control multiple axles. For example, a locomotive may have two motor speed controller that each controls three axles of each truck of the locomotive. While this reduces the cost and complexity of the vehicle, it also can reduce the performance of the vehicle. During movement of the vehicle, a single axle may slip due to a loss in traction between the wheels coupled with the axle and the surface being traveled upon. Because multiple axles are being driven by the same motor speed controller, the loss in traction for one axle results in the tractive effort generated by the other axles driven by the same motor speed controller to be also significantly reduced. This can be referred to as these other axles de-rating. Additionally, if an electrical problem such as a short circuit occurs, the problem can result in a loss of power to all axles coupled to the same motor speed controller.

BRIEF DESCRIPTION

In one embodiment, a system includes plural inverters configured to be onboard a vehicle and to convert direct current into an alternating current, and plural motors configured to receive the alternating current from the inverters. The motors also are configured to be operably coupled with axles of the vehicle to rotate the axles. The inverters are configured to be coupled with and control the motors that rotate non-neighboring axles of the axles in the vehicle.

In one embodiment, a system includes plural motors configured to be operably coupled with axles of a vehicle to rotate the axles, and plural inverters configured to be operably coupled with the motors to control rotation of the axles by the motors. The inverters are configured to be coupled with and control the motors that rotate non-neighboring axles of the axles in the vehicle.

In one embodiment, a system includes plural motors configured to be operably coupled with axles of a vehicle to rotate the axles, and plural inverters with each of the inverters configured to be operably coupled with two of the motors to control rotation of the axles by the motors. The inverters are configured to be coupled with and control the motors that rotate non-neighboring axles of the axles in the vehicle.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments of the inventive subject matter described herein provide propulsion systems and methods for vehicles that combine the power supply to axles having similar tractive effort and common behavior in the vehicles, therefore inherently being able to be controlled by a common motor speed controller, controller and inverter from now on referred to as inverter. The control of multiple axles is performed by a lesser number of inverters. For example, a vehicle having eight axles can have rotation of the axles be controlled by four inverters (or another number of inverters). The multiple axles with common behaviors that are controlled by a common inverter may be non-neighboring or non-adjacent axles, or even not in a common truck. For example, the rotation of the first and third axles (along a direction of travel of the vehicle, the first on first truck, the first on second truck) may be controlled by the same inverter, rotation of the second and fourth axle may be controlled by the yet another inverter (where the second axle is between and separates the first and third axles), and so on.

The axles that are rotated, or driven, by a common inverter are selected for control by the inverter based on common axle weight conditions and rail cleanliness, hence reducing efficiency losses when compared to individual axle control strategy and also gaining efficiency when compared to 3 or 4 motors controlled by one inverter. It should be noted that as each wheel/axles pass on a rail, they inherently help to clean the rail. Therefore, each subsequent axle gets a slightly cleaner and possibly more adherent rail. For example, motors associated to the axles that are similarly affected by weight shifts adjusted by track cleanliness are controlled by the same inverter. As the first axle is unloaded and loses the ability to generate tractive effort (e.g., due to a loss in axle weight due to weight transfer), the amount of power supplied to that axle may decrease to reduce wheel slip. The power is also reduced to the other axle that is affected by the same weight loss than the first axle, as it is controlled by the same common inverter, while the remaining axles continue to be rotated by other motors and other inverters, the latter axles potentially getting the benefit of positive weight increase due to the weight shift process. This increases or maximizes the tractive efforts at these other axles in a way that the total loss of tractive effort of the vehicle will be minimized in comparison to individual axle control.

Figure 1:
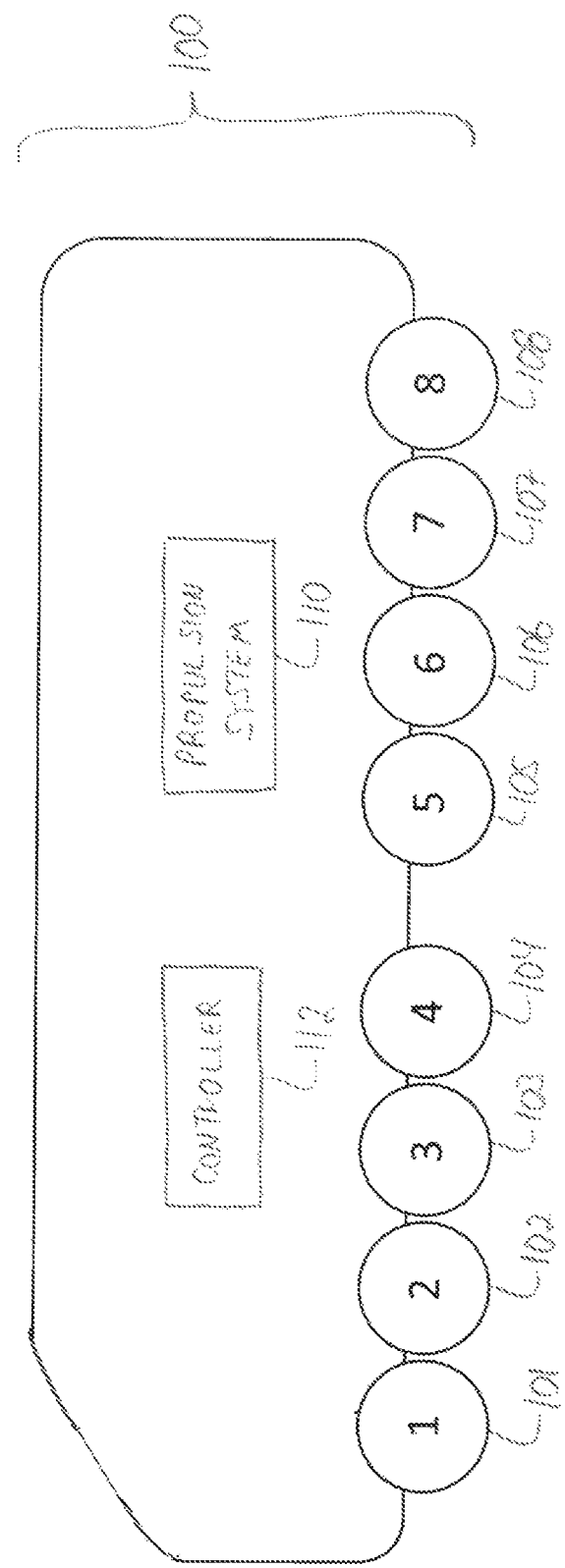
FIG. 1 illustrates a vehicle according to one embodiment.

FIG. 1 illustrates a vehicle 100 according to one embodiment. The vehicle is a propulsion-generating vehicle having multiple wheel-and-axle sets 101-108 (represented as 1, 2, 3, 4, etc., in FIG. 1). Each wheel-and-axle set includes an axle that connects wheels on opposite sides of the vehicle. The wheel-and-axle sets 101-108 may represent the axles that are rotated by motors of the vehicle to move the vehicle along a route, such as a road, track, etc. While the vehicle is shown as an eight axle locomotive, the vehicle may be a rail vehicle with another number of axles, an automobile having wheels that are rotated by motors, or another vehicle.

The vehicle includes a propulsion system 110 that rotates the axles (and the wheels) of the vehicle to propel the vehicle along a surface (e.g., a road, track, etc.). The propulsion system can represent one or more engines, alternators, generators, batteries, inverters, motors, and/or gears or other connections between the motors and the axles and/or wheels. For example, an engine may rotate a shaft to cause a generator to create electric current. This current may be converted into an alternating current by inverters of the propulsion system. The inverters control the supply of the alternating current to the motors to control rotation of the wheels and axles, and therefore control movement of the vehicle. A controller 112 of the vehicle represents hardware circuitry that includes and/or is connected with one or more processors (e.g., microprocessors, field programmable gate arrays, integrated circuits, etc.) that control operation of the propulsion system. The controller may receive input from an operator (e.g., via one or more input device such as a throttle or pedal) and can generate control signals that are communicated to the propulsion system (e.g., the inverters) to control the movement of the vehicle based on the received input. Optionally, the controller may autonomously control movement of the vehicle by generating the control signals without operator input.

Figure 2:
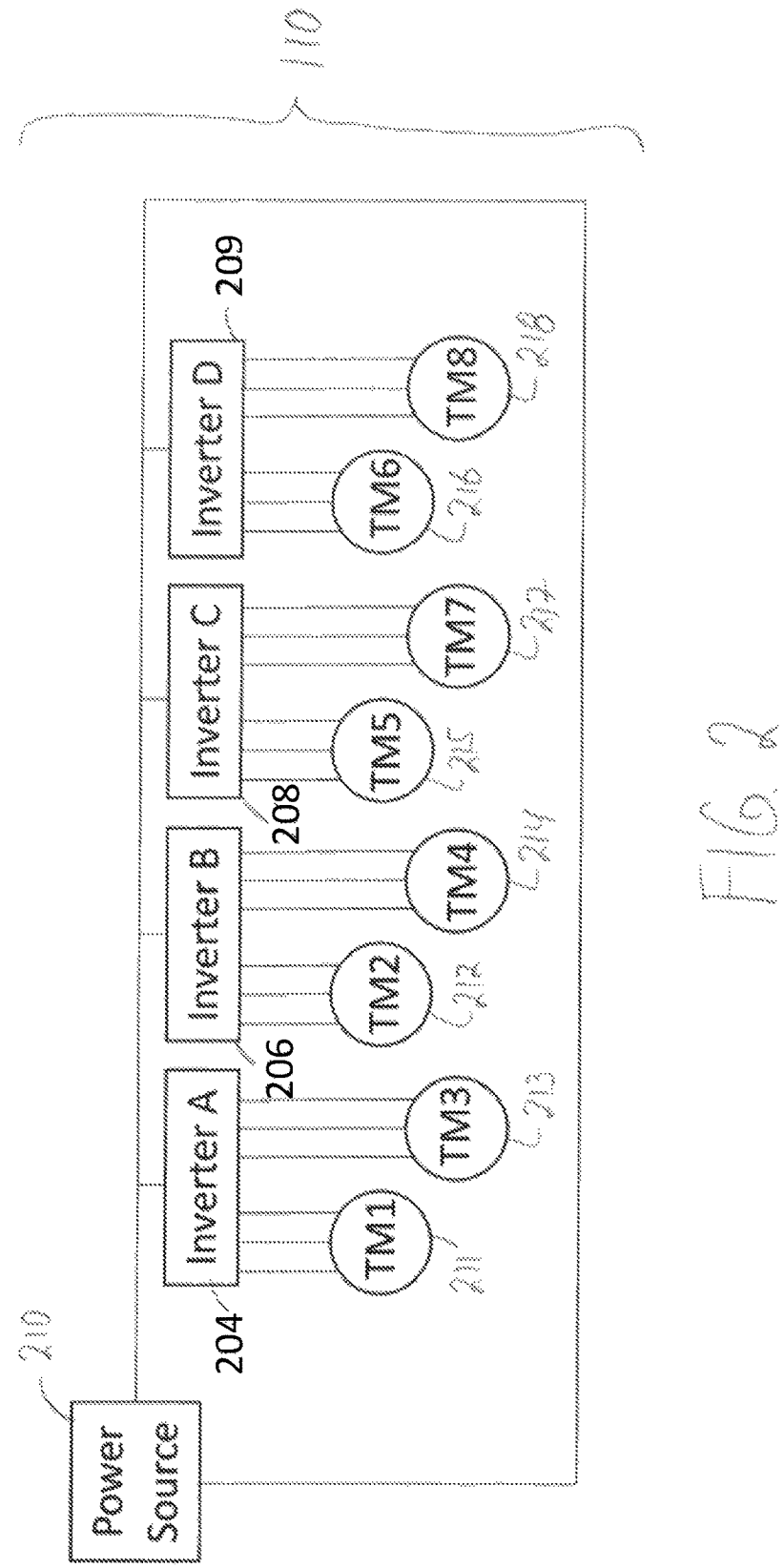
FIG. 2 illustrates a propulsion system of the vehicle shown in FIG. 1 according to one embodiment.

FIG. 2 illustrates the propulsion system 110 of the vehicle 100 shown in FIG. 1 according to one embodiment. The propulsion system includes a power source 210, such as an engine coupled with an alternator or generator, a battery, a circuit that is conductively coupled with an off-board power supply (e.g., a conductive shoe), etc. The power source 210 is conductively coupled with several inverters 204, 206, 208, 209 ("Inverter A," "Inverter B," "Inverter C," and "Inverter D" in FIG. 2). The inverters convert a direct current conducted from the power source to the inverters into an alternating current that is supplied to traction motors 211-218 ("TM1," "TM2," "TM3," "TM4," "TM5," "TM6," "TM7," and "TM8" in FIG. 2). This alternating current powers the traction motors and the traction motors rotate axles 101-108 (shown in FIG. 1) of the vehicle. Although not shown in FIG. 2, the motors may be connected or interconnected with the axles by transmissions, gears, etc. Each motor can separately rotate a different axle. For example, the motor 211 rotates the axle 101 (and not any other axle), the motor 212 may rotate the axle 102 (and not any other axle), and so on.

As shown in FIG. 2, each inverter may be conductively connected with multiple traction motors. The traction motors connected with an inverter are controlled by the inverter in that the inverters control the supply of current to the traction motors to power the traction motors. In the illustrated example, the inverter 204 is connected with and controls operation of the traction motors 211, 213, the inverter 206 is connected with and controls operation of the traction motors 212, 214, the inverter 208 is connected with and controls operation of the traction motors 215, 217, and the inverter 209 is connected with and controls operation of the traction motors 216, 218.

The motors that are controlled by the same inverter may rotate different non-adjacent or non-neighboring axles. For example, the motors 211, 213 may commonly rotate the axles 101, 103 and commonly be connected with and controlled by the same inverter 204, the motors 212, 214 may rotate the axles 102, 104 and be connected with and controlled by the same inverter 206, and so on. The Table below lists which motors are controlled by the different inverters, and which axles are rotated by the different inverters in one embodiment of the inventive subject matter described herein.

TABLE

| Inverter | Motor | Axle |
| --- | --- | --- |
| A (204) | 211 | 101 |
|  | 213 | 103 |
| B (206) | 212 | 102 |
|  | 214 | 104 |
| C (208) | 215 | 105 |
|  | 217 | 107 |
| D (209) | 216 | 106 |
|  | 218 | 108 |

As shown in the Table, the axles that are rotated by motors controlled by the same inverter are non-adjacent or non-neighboring axles. Axles may be non-adjacent or non-neighboring when the axles are not next to each other in the vehicle, or are separated from each other by another axle. For example, axles 101 and 102 may be adjacent or neighboring, but axles 101 and 103 may be non-adjacent or non-neighboring axles due to the axle 102 being between the axles 101 and 103. The same inverter may control rotation of non-adjacent or non-neighboring axles in order to reduce the negative impact on propulsion of the vehicle caused by a loss of traction by one or more of the wheels connected to one of the non-adjacent or non-neighboring axles.

For example, during movement of the vehicle shown in FIG. 1 in a leftward direction (in the perspective of FIG. 1), the first set of wheels and an axle 101 may lose traction. This loss in traction can occur when one or more of the wheels connected with and rotated by the axle 101 slips on the surface on which the vehicle is moving (e.g., the portion of the wheel in contact with the surface moves relative to the surface on which the vehicle is moving). Debris, ice, other moisture, etc., can cause the loss in traction or even simply exceeding the adhesion capability of the wheel/rail (or ground surface) caused by any cause, including a relative reduction in weight applied to the wheel/axle.

A loss in traction by the wheels of one axle also can cause a loss of tractive effort generated by the wheels connected with another axle that is rotated by a motor controlled by the same inverter. For example, if the first two axles 101, 102 of the vehicle in FIG. 1 were controlled by the same inverter, then a loss in traction by the wheels connected with the first axle 101 can cause the motor rotating the axle 102 to rotate other wheels to derate and reduce the tractive effort generated by the axle 102 and wheels connected with the axle. The loss in traction at the wheels connected with the neighboring axles 101, 102 can cause a significant loss in tractive effort generated by the propulsion system 110.

But, if the inverters control the motors that rotate non-neighboring axles, a loss in traction at the wheels of one axle that is controlled by an inverter can cause a decrease in tractive effort generated by another motor that rotates another axle with a similar traction adhesion capacity but that is controlled by the same inverter. For example, the motors 211, 213 that rotate the non-neighboring axles 101, 103 are controlled by the same inverter 204. If the wheels of the axle 101 rotated by the motor 211 lose traction, then the motor 213 that rotates the wheels of the axle 103 with a similar traction adhesion capability as axle 101 may be derated due to the traction loss and because the motors 211, 213 are controlled by the same inverter 204. But, the loss in tractive effort generated by the propulsion system 110 that results from the loss in traction at the wheels of the axle 101 and the derating of the motor that rotates the axle 103 is significantly less than the loss in tractive effort generated by the propulsion system 110 resulting from the motors that rotate neighboring axles being controlled by the same inverter.

While the inverters shown in FIG. 2 control the motors that rotate axles separated from each other by only a single other axle, optionally, the inverters may control motors that rotate axles separated from each other by more axles. For example, an inverter may control motors connected with axles that are separated from each other by two or more axles (along the length of the vehicle).

Coupling motors that separately rotate non-adjacent or non-neighboring axles to the same inverter reduces the cost of providing the propulsion system by having fewer inverters in the propulsion system, while increasing or maximizing the overall tractive effort capability of the vehicle (relative to a propulsion system having the same number of inverters but connected with motors that rotate adjacent or neighboring axles and also compared to a case where one inverter controls more than 2 axles). Reducing the number of inverters can increase reliability and decrease maintenance costs of the propulsion system. The propulsion systems described herein also can reduce the space used to mount the panels for the inverters, as an inverter that controls two motors may take up less space than two inverters, which can allow for smaller outline dimensions for the vehicle to be used. The reduced number of inverters can simplify the complexity of the software operating on the controller, and can reduce the network traffic in the signals communicated between the controller and the inverters.

Figure 3:
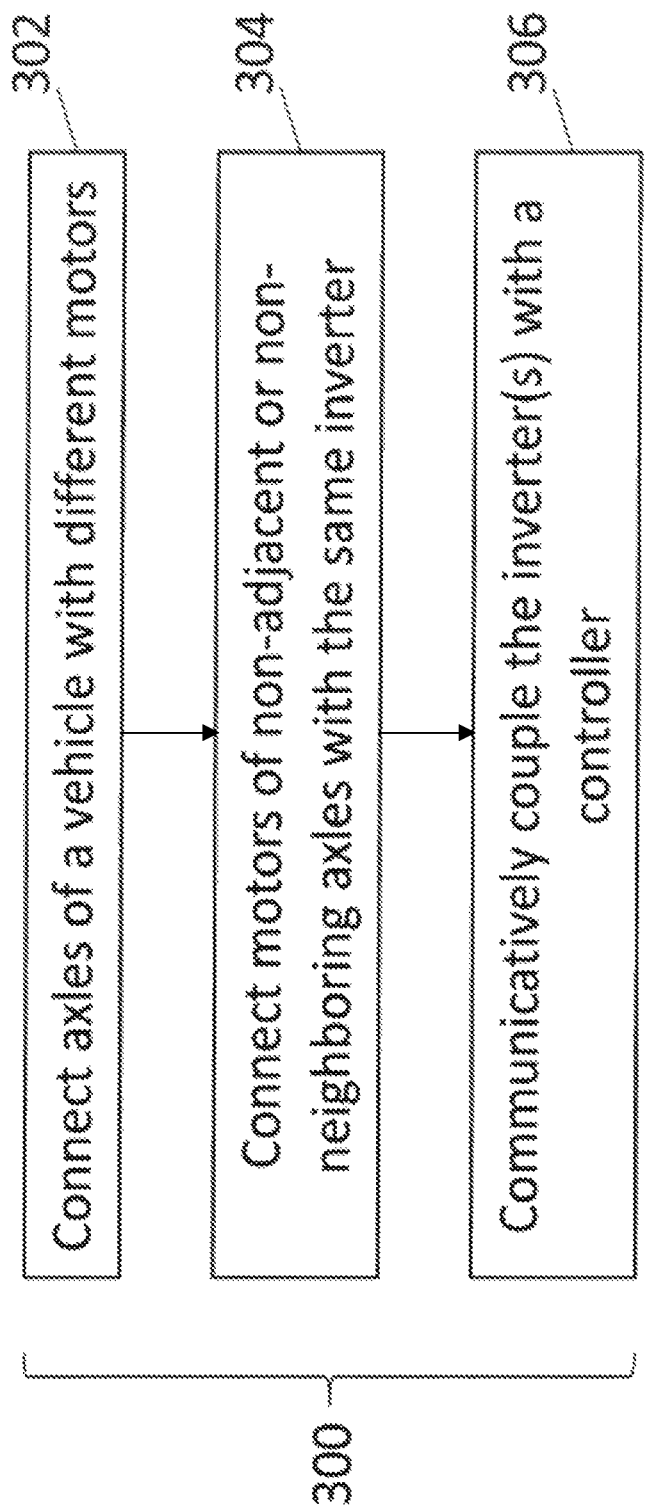
FIG. 3 illustrates a flowchart of one embodiment of a method for providing a vehicle propulsion system.

FIG. 3 illustrates a flowchart of one embodiment of a method 300 for providing a vehicle propulsion system. The method 300 may be used to dictate how inverters of a propulsion system onboard a vehicle are connected with motors that rotate axles (and therefore wheels) of the vehicle. In one embodiment, the method 300 may be used to provide the propulsion system 110 of the vehicle 100 shown in FIG. 1.

At 302, axles of a vehicle are connected with motors. The axles may be connected with the motors by gears or other transmission devices to allow the motors to rotate the axles, which in turn rotates wheels of the vehicle. At 304, motors of non-adjacent or non-neighboring axles of the vehicle are coupled with the same inverter. For example, the separate motors that separately rotate first and third axles (e.g., along the length of the vehicle) may be conductively coupled with a first inverter, the separate motors that separately rotate second and fourth axles may be conductively coupled with a different, second inverter, and so on. At 306, the inverters are communicatively coupled with a controller. The inverters may be communicatively coupled with the controller by one or more wired and/or wireless connections to allow the inverters to receive control signals from the controller. These control signals can dictate how the inverters are to power and control the motors.

In one embodiment, a system includes plural inverters configured to be onboard a vehicle and to convert direct current into an alternating current, and plural motors configured to receive the alternating current from the inverters. The motors also are configured to be operably coupled with axles of the vehicle to rotate the axles. The inverters are configured to be coupled with and control the motors that rotate non-neighboring axles of the axles in the vehicle.

In one example, each of the inverters is configured to be coupled with and control two of the motors that rotate the non-neighboring axles. The non-neighboring axles may be separated from each other along a length of the vehicle by at least one other axle of the axles in the vehicle. The non-neighboring axles may be separated from each other along a length of the vehicle by a single other axle of the axles in the vehicle.

The vehicle can include at least first, second, third, and fourth axles of the axles, the inverters include at least first and second inverters, and the motors include at least first, second, third, and fourth motors that rotate the corresponding first, second, third, and fourth axles. The first inverter can be configured to control the first and third motors and the second inverter can be configured to control the second and fourth motors. The second axle may be between the first and third axles along a length of the vehicle. In one example, each of the motors is configured to separately rotate a different axle of the axles.

In one embodiment, a system includes plural motors configured to be operably coupled with axles of a vehicle to rotate the axles, and plural inverters configured to be operably coupled with the motors to control rotation of the axles by the motors. The inverters are configured to be coupled with and control the motors that rotate non-neighboring axles of the axles in the vehicle.

In one example, each of the inverters is configured to be coupled with and control two of the motors that rotate the non-neighboring axles. The non-neighboring axles may be separated from each other along a length of the vehicle by at least one other axle of the axles in the vehicle. The non-neighboring axles can be separated from each other along a length of the vehicle by a single other axle of the axles in the vehicle.

The vehicle may include at least first, second, third, and fourth axles of the axles, the inverters may include at least first and second inverters, and the motors may include at least first, second, third, and fourth motors that rotate the corresponding first, second, third, and fourth axles. The first inverter can be configured to control the first and third motors and the second inverter can be configured to control the second and fourth motors. In one example, the second axle is between the first and third axles along a length of the vehicle. Each of the motors can be configured to separately rotate a different axle of the axles.

In one embodiment, a system includes plural motors configured to be operably coupled with axles of a vehicle to rotate the axles, and plural inverters with each of the inverters configured to be operably coupled with two of the motors to control rotation of the axles by the motors. The inverters are configured to be coupled with and control the motors that rotate non-neighboring axles of the axles in the vehicle.

In one example, the non-neighboring axles are separated from each other along a length of the vehicle by at least one other axle of the axles in the vehicle.

In one example, the non-neighboring axles are separated from each other along a length of the vehicle by a single other axle of the axles in the vehicle.

In one example, the vehicle includes at least first, second, third, and fourth axles of the axles, the inverters include at least first and second inverters, and the motors include at least first, second, third, and fourth motors that rotate the corresponding first, second, third, and fourth axles. The first inverter can be configured to control the first and third motors and the second inverter is configured to control the second and fourth motors.

In one example, the second axle is between the first and third axles along a length of the vehicle.

In one example, each of the motors is configured to separately rotate a different axle of the axles.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   plural inverters configured to be onboard a vehicle and to convert direct current into an alternating current; and
   plural motors configured to receive the alternating current from the plural inverters, the motors also configured to be operably coupled with axles of the vehicle to rotate the axles, wherein each of the plural inverters is configured to be coupled with and control at least two of the motors that rotate non-neighboring axles of the axles in the vehicle;
   wherein the vehicle includes at least first, second, third, and fourth axles of the axles, the inverters include at least first and second inverters, and the motors include at least first, second, third, and fourth motors that rotate the corresponding first, second, third, and fourth axles, wherein the first inverter is configured to control the first and third motors and the second inverter is configured to control the second and fourth motors;
   wherein the non-neighboring axles are separated from each other along a length of the vehicle by only a single other axle of the axles in the vehicle.

2. The system of claim 1, wherein each of the inverters is configured to be coupled with and control two of the motors that rotate the non-neighboring axles.

3. The system of claim 1, wherein the second axle is the only axle between the first and third axles along a length of the vehicle.

4. The system of claim 1, wherein each of the motors is configured to separately rotate a different axle of the axles.

5. A system comprising:
   plural motors configured to be operably coupled with axles of a vehicle to rotate the axles; and
   plural inverters configured to be operably coupled with the motors to control rotation of the axles by the motors, wherein each of the plural inverters is separately coupled with two or more of the motors that rotate non-neighboring axles of the axles in the vehicle;
   wherein the vehicle includes at least first, second, third, and fourth axles of the axles, the inverters include at least first and second inverters, and the motors include at least first, second, third, and fourth motors that rotate the corresponding first, second, third, and fourth axles, wherein the first inverter is configured to control the first and third motors and the second inverter is configured to control the second and fourth motors;
   wherein the non-neighboring axles are separated from each other along a length of the vehicle by only a single other axle of the axles in the vehicle.

6. The system of claim 5, wherein each of the inverters is configured to be coupled with and control two of the motors that rotate the non-neighboring axles.

7. The system of claim 5, wherein the second axle is the only axle between the first and third axles along a length of the vehicle.

8. The system of claim 5, wherein each of the motors is configured to separately rotate a different axle of the axles.

9. A system comprising:
   plural motors configured to be operably coupled with axles of a vehicle to rotate the axles; and plural inverters with each of the inverters is separately coupled with two of the motors to control rotation of the axles by the motors, wherein each of the inverters is configured to be coupled with and control two or more of the motors that rotate non-neighboring axles of the axles in the vehicle;

wherein the vehicle includes at least first, second, third, and fourth axles of the axles, the inverters include at least first and second inverters, and the motors include at least first, second, third, and fourth motors that rotate the corresponding first, second, third, and fourth axles, wherein the first inverter is configured to control the first and third motors and the second inverter is configured to control the second and fourth motors;

wherein the non-neighboring axles are separated from each other along a length of the vehicle by only a single other axle of the axles in the vehicle.

10. The system of claim 9, wherein the second axle is the only axle between the first and third axles along a length of the vehicle.

11. The system of claim 9, wherein each of the motors is configured to separately rotate a different axle of the axles.

* * * * *